(12) United States Patent
Laduke

(10) Patent No.: US 6,966,349 B1
(45) Date of Patent: Nov. 22, 2005

(54) MISFUELING PREVENTION DEVICE

(76) Inventor: Mark A. Laduke, 52019 Antoinette Dr., Macomb, MI (US) 48042

( * ) Notice: Subject to any disclaimer, the term of this patent is extended or adjusted under 35 U.S.C. 154(b) by 0 days.

(21) Appl. No.: 11/143,070

(22) Filed: Jun. 2, 2005

(51) Int. Cl.[7] .............................................. B65B 1/04
(52) U.S. Cl. .................................... 141/367; 220/86.2
(58) Field of Search ............................... 141/348–350, 141/367, 378; 220/86.2

(56) References Cited

U.S. PATENT DOCUMENTS

| | | | |
|---|---|---|---|
| 3,730,216 A | | 5/1973 | Arnett et al. |
| 3,845,877 A | | 11/1974 | Arnett et al. |
| 3,911,977 A | | 10/1975 | Berger |
| 3,942,564 A | | 3/1976 | Nakazato |
| 4,034,784 A | | 7/1977 | Ball et al. |
| 4,527,601 A | | 7/1985 | Middleton et al. |
| 4,529,097 A | | 7/1985 | Larson |
| 4,733,791 A | | 3/1988 | Sinclair |
| 5,325,979 A | | 7/1994 | Watanabe |
| 5,865,222 A | * | 2/1999 | Diamond ..................... 141/86 |
| 6,302,169 B1 | * | 10/2001 | Pulos ......................... 141/301 |
| 2003/0150507 A1 | | 8/2003 | Channing |

* cited by examiner

*Primary Examiner*—Steven O. Douglas
(74) *Attorney, Agent, or Firm*—Brooks Kushman P.C.

(57) ABSTRACT

A misfueling prevention device is adapted to prevent an undesired fuel nozzle from being used to fill a desired fuel tank and to permit the filling of the tank by a desired fuel nozzle having a diameter larger than a diameter of the undesired fuel nozzle. The device includes an outer filler tube having an inner diameter and an inner filler tube having inner and outer diameters. The inner diameter of the inner filler tube defines a fuel passageway. The inner diameter of the outer filler tube and the outer diameter of the inner filler tube define a space therebetween. The device also includes at least one support which supports the inner filler tube within the outer filler tube. The inner diameter of the outer filler tube and the inner and outer diameters of the inner filler tube are sized to allow the desired fuel nozzle to fit over the inner filler tube and to prevent the undesired fuel nozzle from entering either the fuel passageway or the space between the inner and outer filler tubes to prevent the tank from being filled with the undesired fuel.

15 Claims, 1 Drawing Sheet

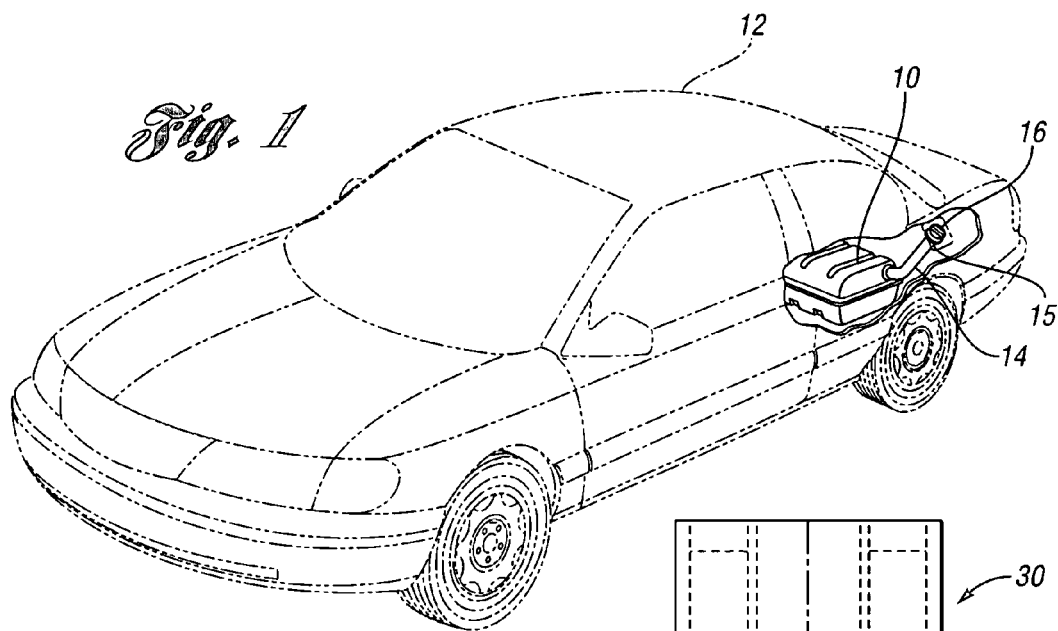
Fig. 1
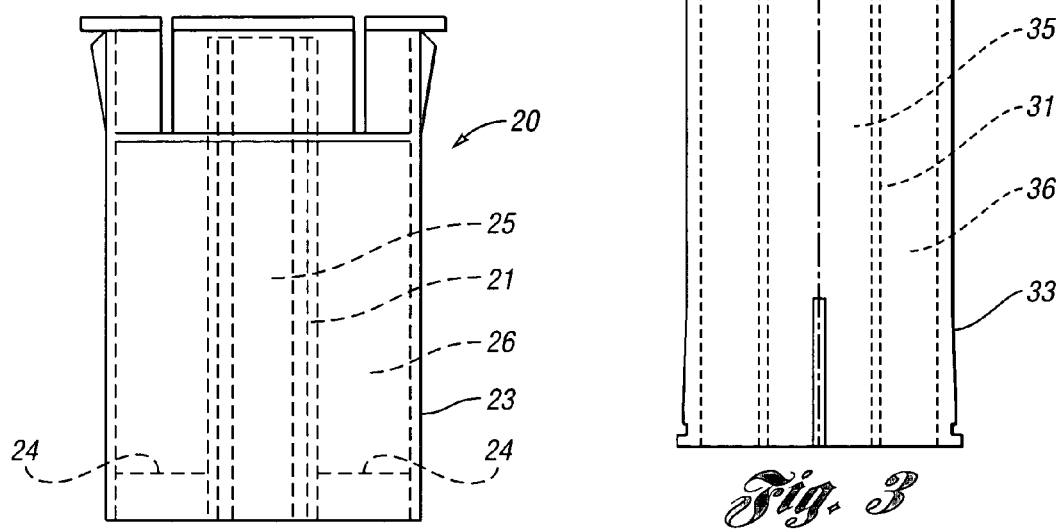
Fig. 2
Fig. 3
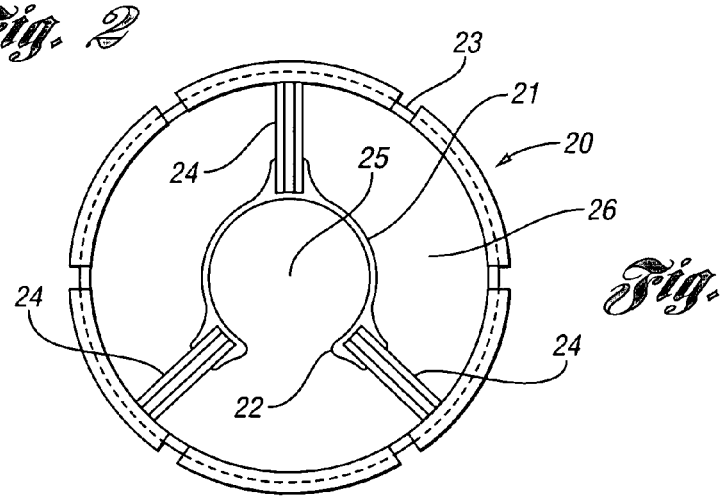
Fig. 4

MISFUELING PREVENTION DEVICE

BACKGROUND OF THE INVENTION

1. Field of the Invention

This invention relates generally to misfueling prevention devices and, in particular, to misfueling prevention devices which prevent an undesired fuel nozzle from being used to fill a desired fuel tank, such as a diesel fuel tank.

2. Background Art

Currently, it appears that there is not a cost effective way of preventing a diesel fuel tank from being filled with an undesired fuel such as unleaded gas. The consequences of running unleaded gas in a diesel engine may be costly. The engine may need repair or even replacement. Also, there are costly fuel disposal fees.

An unleaded nozzle is smaller in diameter than a diesel nozzle. U.S. Pat. No. 3,730,216 to Arnett et al. discloses a nozzle restrictor. The restrictor prevents a nozzle which is larger in diameter than a smaller unleaded fuel nozzle from filling the gas tank.

Other U.S. patent references related to the present invention are as follows: 6,302,169; 5,325,979; 4,733,791; 4,529,097; 4,527,601; 4,034,784; 3,942,564; 3,911,977; 3,845,877; and 2003/0150507.

Accordingly, there is a clearly felt need in the art for a diesel fuel nozzle restrictor, which prevents a diesel tank from being filled with unleaded gasoline.

SUMMARY OF THE INVENTION

An object of the present invention is to provide an improved misfueling prevention device which accepts larger diameter fuel nozzles but obstructs smaller diameter fuel nozzles.

Another object of the present invention is to provide a simple and reliable misfueling prevention device which is effective in operation.

In carrying out the above object, and other objects of the present invention, a misfueling prevention device adapted to prevent an undesired fuel nozzle from being used to fill a desired fuel tank and to permit the filling of the tank by a desired fuel nozzle having a diameter larger than a diameter of the undesired fuel nozzle is provided. The device includes an outer filler tube having an inner diameter and an inner filler tube having inner and outer diameters. The inner diameter of the inner filler tube defines a fuel passageway. The inner diameter of the outer filler tube and the outer diameter of the inner filler tube define a space therebetween. The device also includes at least one support which supports the inner filler tube within the outer filler tube. The inner diameter of the outer filler tube and the inner and outer diameters of the inner filler tube are sized to allow the desired fuel nozzle to fit over the inner filler tube and to prevent the undesired fuel nozzle from entering either the fuel passageway or the space between the inner and outer filler tubes to prevent the tank from being filled with the undesired fuel.

The desired fuel may be diesel fuel.

The inner filler tube may be centered within the outer filler tube. The inner filler tube has upper and lower end surfaces. The inner filler tube may include an axially extending slot which extends from the upper end surface of the inner filler tube towards the lower end surface. The axially extending slot may extend the entire length of the inner filler tube between the upper and lower end surfaces.

Further, in carrying out the above objects and other objects of the present invention, a misfueling prevention device adapted to prevent an undesired fuel nozzle from being used to fill a desired fuel tank and to permit the filling of the tank by a desired fuel nozzle having a diameter larger than a diameter of the undesired fuel nozzle is provided. The device includes an outer filler tube having an inner diameter. The outer filler tube is formed as an integral part of a filler neck of the desired fuel tank. The device further includes an inner filler tube having inner and outer diameters. The inner diameter of the inner filler tube defines a fuel passageway and the inner diameter of the outer filler tube and the outer diameter of the inner filler tube defines a space therebetween. The device also includes at least one support which supports the inner filler tube within the outer filler tube. The inner diameter of the outer filler tube and the inner and outer diameters of the inner filler tube are sized to allow the desired fuel nozzle to fit over the inner filler tube and to prevent the undesired fuel nozzle from entering either the fuel passageway or the space between the inner and outer filler tubes to prevent the tank from being filled with the undesired fuel.

The desired fuel may be diesel fuel.

The inner filler tube may be centered within the outer filler tube. The inner filler tube has upper and lower end surfaces. The inner filler tube may include an axially extending slot which extends from the upper end surface of the inner filler tube towards the lower end surface. The axially extending slot may extend the entire length of the inner filler tube between the upper and lower end surfaces.

Still further in carrying out the above objects and other objects of the present invention, a misfueling prevention device adapted to prevent an undesired fuel nozzle from being used to fill a desired fuel tank and to permit the filling of the tank by a desired fuel nozzle having a diameter larger than a diameter of the undesired fuel nozzle is provided. The device includes an outer filler tube having an inner diameter. The outer filler tube may be attached to a filler neck of the desired fuel tank. The device also includes an inner filler tube having inner and outer diameters. The inner diameter of the inner filler tube defines a fuel passageway. The inner diameter of the outer filler tube and the outer diameter of the inner filler tube defines a space therebetween. The device also includes at least one support which supports the inner filler tube within the outer filler tube. The inner diameter of the outer filler tube and the inner and outer diameters of the inner filler tube are sized to allow the desired fuel nozzle to fit over the inner filler tube and to prevent the undesired fuel nozzle from entering either the fuel passageway or the space between the inner and outer filler tubes to prevent the tank from being filled with the undesired fuel.

The desired fuel may be diesel fuel.

The inner filler tube may be centered within the outer filler tube. The inner filler tube has upper and lower end surfaces. The inner filler tube may include an axially extending slot which extends from the upper end surface of the inner filler tube towards the lower end surface. The axially extending slot may extend the entire length of the inner filler tube between the upper and lower end surfaces.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a perspective view of a motor vehicle with parts broken away to show a fuel tank and filler neck installation;

FIG. 2 is a side view of one embodiment of a misfueling prevention device constructed in accordance with the present invention;

FIG. 3 is a side view of another embodiment of the invention; and

FIG. 4 is a top plan view of the device of FIG. 2.

DETAILED DESCRIPTION OF THE PREFERRED EMBODIMENT(S)

Referring to FIG. 1, a fuel tank 10 such as a diesel fuel tank is conventionally installed in a motor vehicle 12. The tank 10 has an inlet formed by an outwardly and upwardly extending filler neck 14 which has its outermost and uppermost end 15 closed by a threaded cap 16.

Referring to FIGS. 2 and 3, two embodiments of a misfueling prevention device constructed in accordance with the present invention are disclosed at 20 and 30, respectively. Each device 20 or 30 includes a long inner cylinder-like filler tube 21 or 31, respectively, having an axially extending slot or opening (22 in FIG. 4).

The slot 22 extends the full length of the inner tube 21 or 31 between upper and lower end surfaces thereof to allow all sized diesel fuel nozzles to fit into the device 20 or 30, respectively, and also prevents any unleaded gas nozzles from entering the device 20 or 30. The device 20 or 30 also includes an outer, cylinder-like tube 23 or 33, respectively, having the same length as its inner tube 21 or 31 and a much larger diameter. The outer tube 23 or 33 is connected to its inner tube 21 or 31, respectively, around the bottom of its device 20 or 30 by at least one (and preferably three) supports (24 in FIGS. 2 and 4). The inner tube 21 or 31 is centered inside its outer tube 23 or 33, respectively, by the supports 24 which allow diesel fuel to pass therethrough and also secure the inner tube 21 or 31 to its outer tube 23 or 33, respectively.

The inner filler tube 21 or 31 is sized at its inner and outer diameters to fit any diesel filler nozzle (not shown) over it and restrict any unleaded gas nozzles (not shown) from entering either a fuel passageway 25 or 35 in the inner filler tube 21 or 31, respectively, or the space 26 or 36 between the inner filler tube 21 or 31 and the outer filler tube 23 or 33, respectively.

The inner tube diameter does not change for different vehicles unlike the outer tube diameter which typically varies for each make and vehicle model.

The inner tube 21 or 31 may be manufactured into the diesel filler tube or neck 14 together with the supports 24 to restrict unleaded fuel nozzles from entering the neck 14. Alternatively, the device 20 or 30 may be inserted into the diesel fuel filler tube or neck 14 after removing the fuel cap 16.

The device 20 or 30: (1) protects a diesel engine from unleaded fuel; (2) prevents costly repairs and contaminated fuel disposal; and (3) keeps unleaded fuel nozzles from entering the diesel fuel filler tube 14. The device 20 or 30 has no moving parts to wear out or jam up.

The device 20 or 30 may be made of plastic or metal or almost any other material compatible with diesel fuel.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A misfueling prevention device adapted to prevent an undesired fuel nozzle from being used to fill a desired fuel tank and to permit the filling of the tank by a desired fuel nozzle having a diameter larger than a diameter of the undesired fuel nozzle, the device comprising:
    an outer filler tube having an inner diameter;
    an inner filler tube having inner and outer diameters, the inner diameter of the inner filler tube defining a fuel passageway and the inner diameter of the outer filler tube and the outer diameter of the inner filler tube defining a space therebetween; and
    at least one support which supports the inner filler tube within the outer filler tube wherein the inner diameter of the outer filler tube and the inner and outer diameters of the inner filler tube are sized to allow the desired fuel nozzle to fit over the inner filler tube and to prevent the undesired fuel nozzle from entering either the fuel passageway or the space between the inner and outer filler tubes to prevent the tank from being filled with the undesired fuel.

2. The device as claimed in claim 1, wherein the desired fuel is diesel fuel.

3. The device as claimed in claim 1, wherein the inner filler tube is centered within the outer filler tube.

4. The device as claimed in claim 1, wherein the inner filler tube has upper and lower end surfaces and wherein the inner filler tube includes an axially extending slot which extends from the upper end surface of the inner filler tube towards the lower end surface.

5. The device as claimed in claim 4, wherein the axially extending slot extends the entire length of the inner filler tube between the upper and lower end surfaces.

6. A misfueling prevention device adapted to prevent an undesired fuel nozzle from being used to fill a desired fuel tank and to permit the filling of the tank by a desired fuel nozzle having a diameter larger than a diameter of the undesired fuel nozzle, the device comprising:
    an outer filler tube having an inner diameter wherein the outer filler tube is formed as an integral part of a filler neck of the desired fuel tank;
    an inner filler tube having inner and outer diameters, the inner diameter of the inner filler tube defining a fuel passageway and the inner diameter of the outer filler tube and the outer diameter of the inner filler tube defining a space therebetween; and
    at least one support which supports the inner filler tube within the outer filler tube wherein the inner diameter of the outer filler tube and the inner and outer diameters of the inner filler tube are sized to allow the desired fuel nozzle to fit over the inner filler tube and to prevent the undesired fuel nozzle from entering either the fuel passageway or the space between the inner and outer filler tubes to prevent the tank from being filled with the undesired fuel.

7. The device as claimed in claim 6, wherein the desired fuel is diesel fuel.

8. The device as claimed in claim 6, wherein the inner filler tube is centered within the outer filler tube.

9. The device as claimed in claim 6, wherein the inner filler tube has upper and lower end surfaces and wherein the inner filler tube includes an axially extending slot which extends from the upper end surface of the inner filler tube towards the lower end surface.

10. The device as claimed in claim 9, wherein the axially extending slot extends the entire length of the inner filler tube between the upper and lower end surfaces.

11. A misfueling prevention device adapted to prevent an undesired fuel nozzle from being used to fill a desired fuel tank and to permit the filling of the tank by a desired fuel nozzle having a diameter larger than a diameter of the undesired fuel nozzle, the device comprising:

an outer filler tube having an inner diameter wherein the outer filler tube may be attached to a filler neck of the desired fuel tank;

an inner filler tube having inner and outer diameters, the inner diameter of the inner filler tube defining a fuel passageway and the inner diameter of the outer filler tube and the outer diameter of the inner filler tube defining a space therebetween; and at least one support which supports the inner filler tube within the outer filler tube wherein the inner diameter of the outer filler tube and the inner and outer diameters of the inner filler tube are sized to allow the desired fuel nozzle to fit over the inner filler tube and to prevent the undesired fuel nozzle from entering either the fuel passageway or the space between the inner and outer filler tubes to prevent the tank from being filled with the undesired fuel.

12. The device as claimed in claim 11, wherein the desired fuel is diesel fuel.

13. The device as claimed in claim 11, wherein the inner filler tube is centered within the outer filler tube.

14. The device as claimed in claim 11, wherein the inner filler tube has upper and lower end surfaces and wherein the inner filler tube includes an axially extending slot which extends from the upper end surface of the inner filler tube towards the lower end surface.

15. The device as claimed in claim 14, wherein the axially extending slot extends the entire length of the inner filler tube between the upper and lower end surfaces.

* * * * *